July 15, 1947.　　　C. M. SAVRDA　　　2,424,057
FISH FILLETING MACHINE
Filed May 10, 1944　　　3 Sheets-Sheet 1

INVENTOR.
CHARLES M. SAVRDA
BY
ATTORNEY.

July 15, 1947.  C. M. SAVRDA  2,424,057
FISH FILLETING MACHINE
Filed May 10, 1944  3 Sheets-Sheet 2
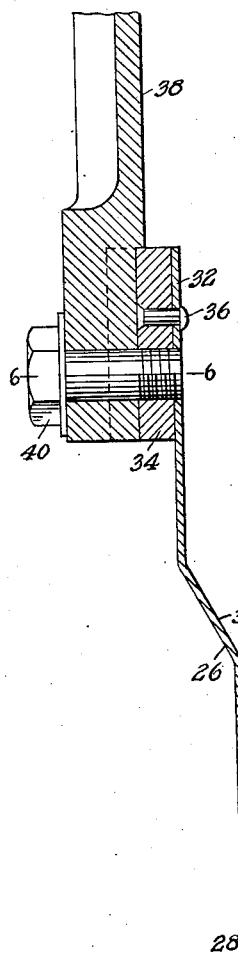
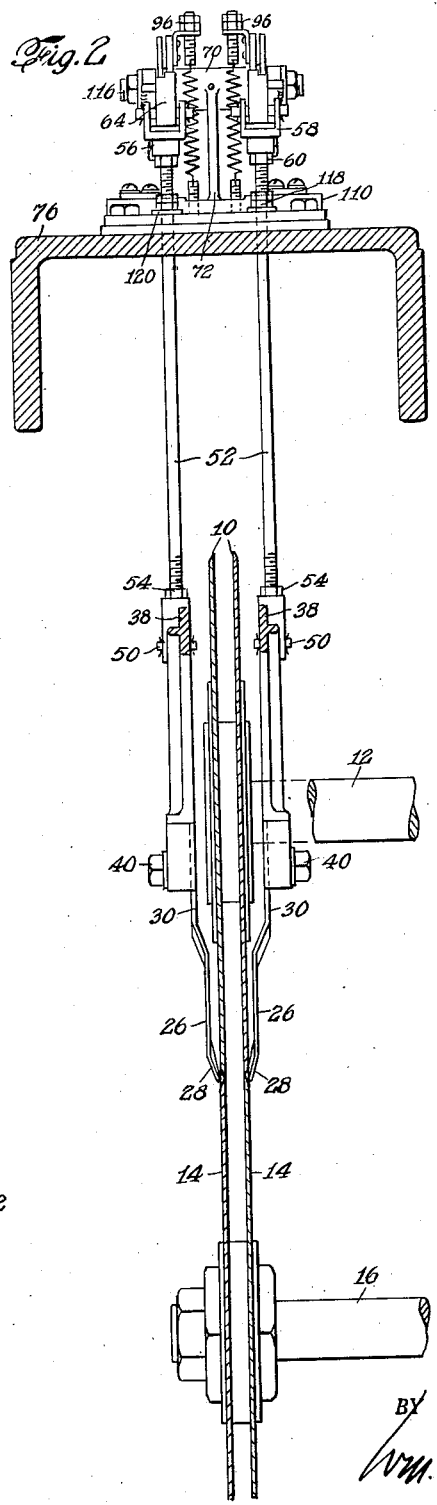
INVENTOR.
CHARLES M. SAVRDA
BY
ATTORNEY.

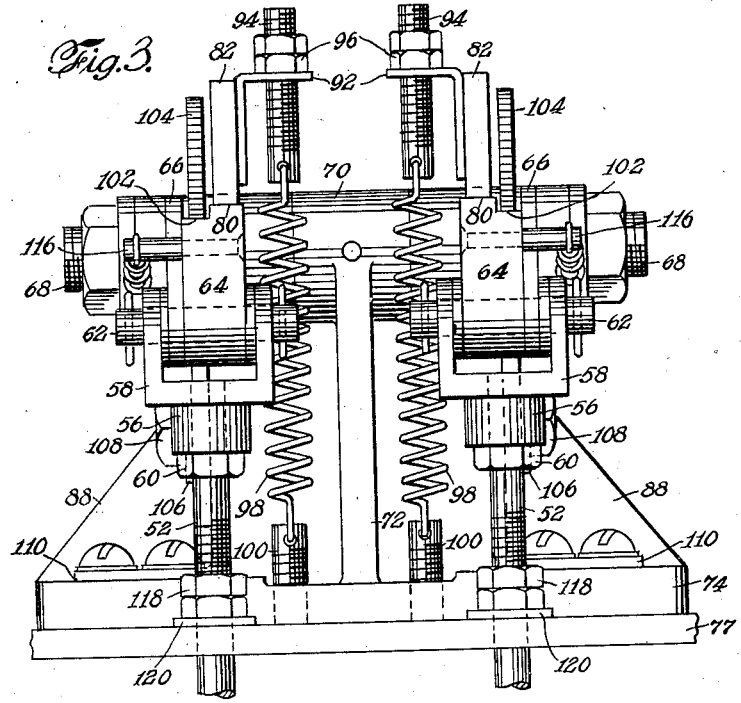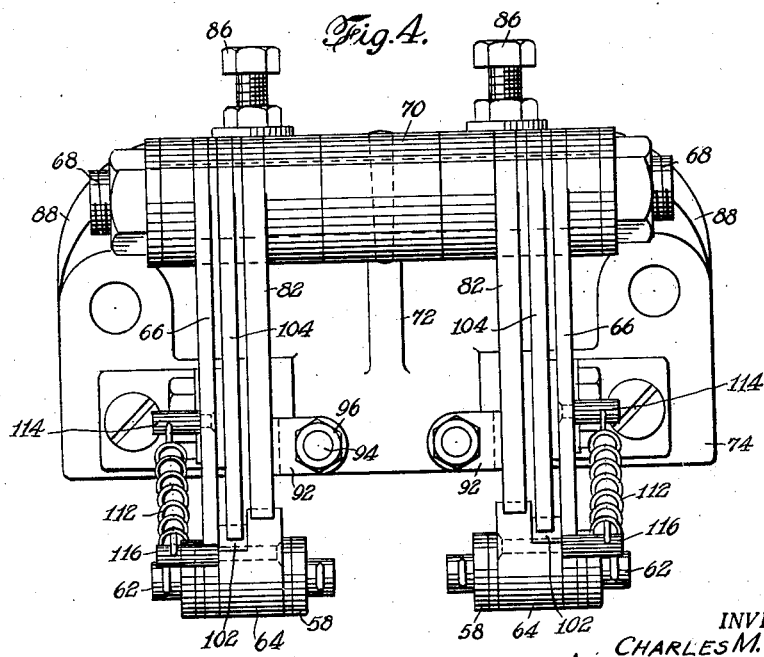

Patented July 15, 1947

2,424,057

UNITED STATES PATENT OFFICE 2,424,057

FISH FILLETING MACHINE

Charles M. Savrda, Bay Shore, N. Y., assignor to The Atlantic Coast Fisheries Company, New York, N. Y., a corporation of Maine Application May 10, 1944, Serial No. 534,874

10 Claims. (Cl. 17—4)

This invention relates to improvements in fish filleting machines, and more particularly to means for deflecting the fish from the belly-slitting knives onto the ribbing knives.

United States Patent 2,149,021 discloses a fish filleting machine in which the fish to be filleted are fed into the machine one at a time, back down and tail leading. The fish are introduced into the machine so that a pair of tail-gripping devices engage the tail on opposite sides and clamp it therebetween. The gripping devices are mounted on a carrier, such as a pair of chains, so as to move during their gripping action in a horizontal plane away from the feeding point. Their movement carries the fish along, with their backs down, through various successive stations whereby parallel incisions (beginning at the tail end) are made in the back of each fish and extend up to almost the backbone. These incisions extend all the way to the head end of the fish (which has preferably been decapitated). The fish are then guided to a pair of belly-slicing disc knives which are positioned to rotate on an axis above the plane of the movement of the gripping devices. These knives are rotatably and yieldably supported so that when the tail of the fish first engages them, they are pushed upwardly. Just before the fish reach these knives, the belly fins are engaged by a straightening device, which straightens them into a vertical plane so that they may pass between the belly-slicing knives. Rotatably mounted below these knives are a pair of discs which engage in the back incisions and aid in continuing the movement of the fish, the gripping devices having now disengaged them. About the time the gripping devices disengage the tails of the fish, means are provided to give the fish a movement toward the belly-slicing knives to insure the feeding of the fish sufficiently thereon so that they, together with the traction discs (both of which are rotating at high speed), will cause the fish to pass between them. The belly-slicing knives make a pair of parallel incisions closely contiguous to and on opposite sides of the belly spikes almost up to the backbone. These knives continue their cutting until they reach the belly cavity and travel on through it as the fish move through the zone of action of the knives. At this stage of the operation, the fillets are attached by a small ribbon of flesh to the backbone of the fish and also to the ribs of the fish. As the fish leave the zone of action of the belly-slitting knives, they are projected onto a pair of ribbing knives sufficiently spaced so that the backbone may move between them. The fish are next gripped by feeding devices which engage in the belly cavity and convey the fish over the ribbing knives, which are so shaped as to scrape the flesh from the sides of the ribs.

United States Patent 2,137,291 and copending application Serial No. 525,546 (now United States Patent 2,406,907) disclose dorsal fin-removing devices which may be used in conjunction with the apparatus of Patent 2,149,021. When such dorsal fin-removing devices are utilized, it will be understood that they are positioned in advance of the mechanisms which make the incisions in the back of the fish almost to the backbone.

An object of this invention is to provide a new and improved means for deflecting the fish as it passes from the zone of action of the belly-slicing knives to the ribbing knives.

Another object of this invention is to position a deflector relative to the belly-slicing knives and the ribbing knives so as to positively deflect the fish as it leaves the zone of action of the belly-slicing knives to the ribbing knives.

An additional object of this invention is to provide a tension-mounted deflector which does not deleteriously affect the backbone which it engages.

A further object of this invention is to provide a tension-mounted deflector which is released when the large portion of the backbone is engaged thereby.

A still further object of this invention is to provide a tension-mounted deflector which automatically resets itself after being released.

Other and additional objects will appear hereafter.

The above objects are accomplished, in general, by providing a deflector comprising a pair of spaced hold-down members which enter the incisions made by the belly-slitting knives and engage the backbone of a fish adjacent each side thereof as the fish passes, tail leading and back downward, from the zone of action of the belly-slitting knives and traction discs, and positively deflects the fish and directs it in proper position onto the ribbing knives. The deflector is positioned so that the edges thereof which engage the backbone are angularly disposed and so that the heels of said members overlap the belly-slitting knives and the toes thereof extend between and preferably below the top edges of the ribbing knives. The hold-down members are held under tension by a mechanism which, when the large portion of the backbone is engaged, releases the tension and the hold-down mechanism is moved out of contact with the backbone. Means are also provided to automatically re-set the hold-down mechanism to the original position after the tension has been released.

The specific details of construction of a preferred embodiment of the invention will now be described in connection with the drawings, wherein an illustrative embodiment is shown and wherein:

Figure 2 is a section taken on the line 2—2 of Figure 1;

Figure 3 is an enlarged view of the hold-down mechanism looking to the left in Figure 1;

Figure 4 is a top plan view of the hold-down mechanism;

Figure 5 is a detail section of one of the hold-down members taken on the line 5—5 of Figure 1; and Figure 6 is a section taken on the line 6—6 of Figure 5.

Figure 1:
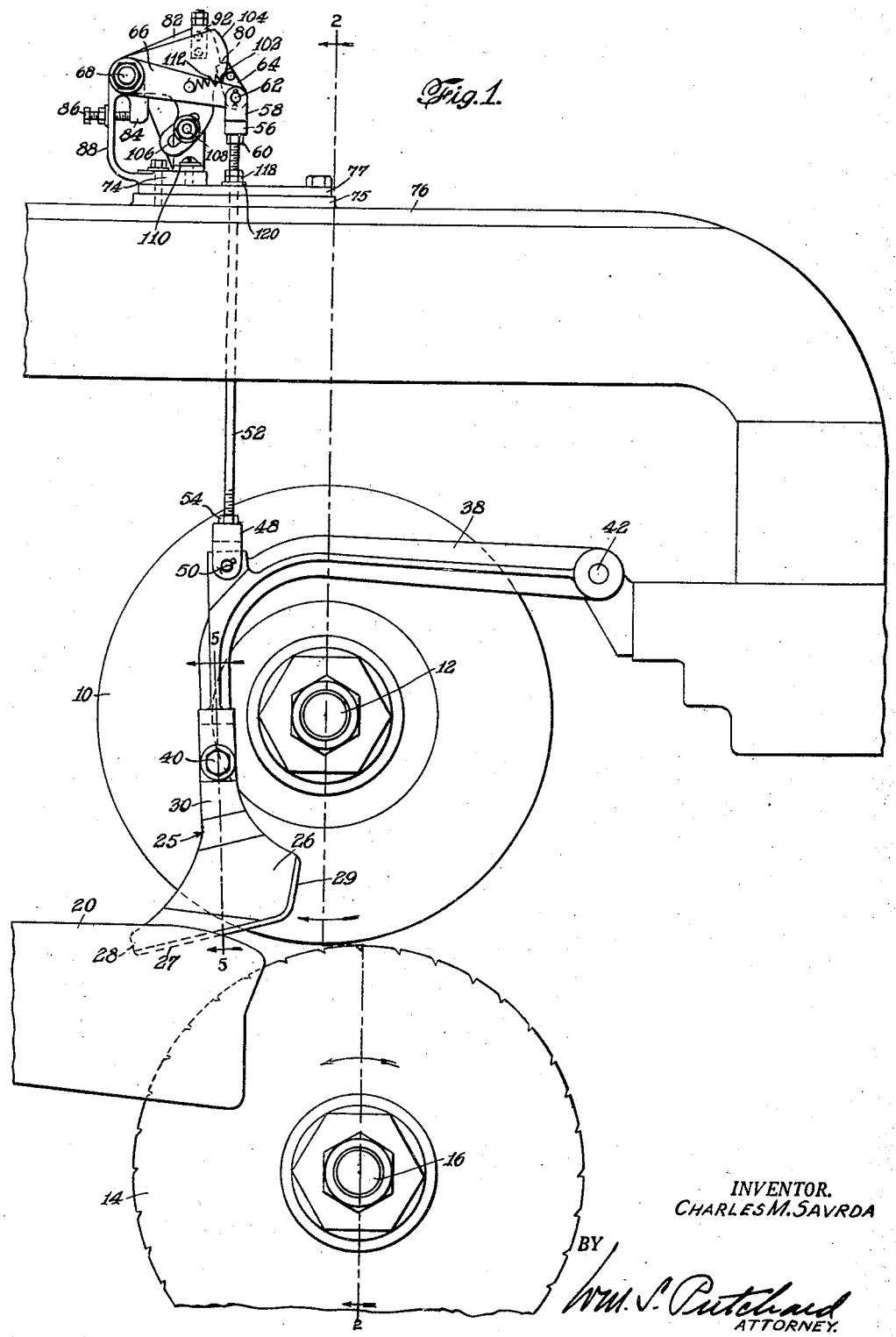
Figure 1 is a side elevation of the hold-down mechanism showing its position with respect to the belly-slitting knives and the ribbing knives.

Referring now to the drawings wherein like reference numerals designate like parts, the reference numeral 10 designates a pair of spaced rotary circular belly-slitting knives which are rotatably mounted on a shaft 12 appropriately journaled in the frame of the machine (not shown). Below the belly-slitting knives 10 are a pair of spaced traction discs 14 which are rotatably mounted on a shaft 16, also appropriately mounted in the machine (not shown). The belly-slitting knives 10 are spaced sufficiently to make a pair of parallel incisions closely contiguous to and on opposite sides of the belly spikes almost up to the backbone. The traction discs 14 are spaced so that they will enter the incisions made in the back by parts of the machine (not shown) and the backbone will ride thereon.

The precise manner of mounting the belly-slitting knives 10 and the discs 14, as well as the details of construction thereof, form no part of this invention. They may be mounted and constructed as shown, for example, in Figure 33 of United States Patent 2,149,021 and in Figure 1 of United States Patent 2,149,022.

At the discharge end of the belly-slitting knives, there is provided a pair of ribbing knives 20 which may be of the type shown in United States Patent 2,179,821, or in copending application Serial No. 534,847 (now United States Patent 2,400,118). Preferably cooperating with the ribbing knives 20 is a ribbing conveyer (not shown) which is adapted to engage the fish and convey it across the ribbing knives. A suitable ribbing conveyer is shown in United States Patent 2,149,021 (Figures 31, 32), and in copending application Serial No. 530,967 (now United States Patent 2,397,158).

The specific details of construction of the belly-slitting knives 10, the traction discs 14, and the ribbing knives 20 form no part of this invention and further detailed description thereof is considered unnecessary.

Adjacent the discharge end of the belly-slitting knives 10, there is provided a deflector, generally indicated by the reference numeral 25, having a pair of spaced substantially shoe-shaped hold-down members 26. Since the details of construction of and the means of mounting each hold-down member 26 are the same, only one of such hold-down members and the means of mounting the same will be described in detail.

The bottom edge 27 of each hold-down member 26 is inclined downwardly, whereby the toe 28 of the hold-down member is positioned interiorly of the respective adjacent ribbing knife 20 and extends below the top edge thereof, and the heel 29 is positioned in close proximity to and overlaps on the exterior face of the respective adjacent belly knife 10. In order to inhibit any cutting action, each bottom edge 27 and each heel 29 is rounded and the hold-down member 26 is beveled adjacent thereto.

Each hold-down member 26 is carried at one end of an arm 30 formed integral therewith. A channel member 32, together with a block 34 on the bottom thereof, is secured adjacent the top of the arm 30 by means of a rivet 36. One end of a curved lever 38 is positioned in the channel 32 and is secured thereto by means of a screw 40. The other end of the lever 38 is pivotally mounted on a shaft 42 appropriately mounted on the frame of the machine.

A yoke 48 having an interiorly threaded hole is pivotally mounted by a pin 50 on the lever 38. One end of a rod 52 is threadedly positioned in the yoke 48 and is secured in adjusted position by means of a lock nut 54. The rod 52 at its opposite end is threaded into a boss 56 of a yoke 58. A lock nut 60 secures the rod 52 in adjusted position in the boss 56. The arms of the yoke 58 carry a pin 62 on which there is pivotally mounted a dog 64. One end of an arm 66 is also secured to the pin 62 carried by the yoke 58, the other end of the arm 66 being pivotally (rotatably) mounted on a shaft 68 which is keyed in a central bearing 70 carried on a rib 72 of a base 74, which is appropriately secured to a boss 75 of a cross member 76 of the machine. A plate 77 is positioned intermediate the boss 75 and the base 74.

The dog 64 cooperates with a notch 80 of a member 82 which is pivotally (rotatably) mounted on the shaft 68. The member 82 is provided with a depending boss 84 which cooperates with an adjustable screw 86 carried in an arm 88 which is formed integral with the base 74. An ear 92 is secured to the member 82 and carries a screw 94 which is adjustably mounted thereon. A lock nut 96 secures the screw 94 in adjusted position. The lower end of the screw 94 is secured to one end of a spring 98, the other end of the spring 98 being secured to a screw 100 carried by the base 74. By adjustment of the lock nut 96, the pressure on the rod 52 may be increased or decreased as desired depending on the nature of the fish being treated.

The dog 64 is formed with a cam surface 102 which is adapted to cooperate with a cam 104 mounted on the shaft 68. The cam 104 is provided with a slot 106 which cooperates with a screw 108 and a support 110, whereby the cam 104 can be adjusted in position to permit the tripping action hereafter described to be effected at a predetermined time. One end of a spring 112 is secured to a pin 114 on the arm 66 and the other end onto a pin 116 on the dog 64.

It is to be noted that the base 74 and the shaft 68 are common to the tension and trip mechanism for each hold-down member.

From the foregoing details of construction, it is apparent that each hold-down member is adjustably and yieldingly mounted and that, when the rods 52 are elevated a predetermined amount by a fish, the cam 104 will urge the cam follower 102 outwardly, whereby the dog 64 will be disengaged from the notch 80 and the pressure on the hold-down members released. At this time the spring 98 will re-set the member 82 to original position.

After the fish is out of the zone of action of the hold-down members 26, the rods 52 will, due to the action of gravity, move downward, the downward movement being limited by a stop nut 118, engaging the plate 77. A washer 120 is positioned intermediate the stop nut 118 and the plate 77. When the rods 52 are at the end of their downward movement, the spring 112 will urge the dog 64 into locking engagement with the notch 80.

In operation, a fish, tail leading and back downward and in which the dorsal fin preferably has been removed and the back has been cut almost up to the backbone, is fed between the rotary belly knives 10 and the traction discs 14. Due to the high peripheral speeds of the belly-slitting knives 10 and the traction discs 14, the fish is projected therefrom and it passes between the hold-down members 26. Due to the position of the hold-down members 26 relative to the belly-cutting knives, the tail fin passes between the hold-down members 26 and is positioned so that it will pass between the ribbing knives. The edges of the hold-down members engage the backbone of the fish at the top thereof and direct it in proper position onto the ribbing knives 20, over which the ribbing conveyers cause it to pass. The backbone of the fish adjacent the tail which comes in contact with the hold-down members 26 first is relatively small and, as the fish passes therethrough, it becomes larger and larger. Due to the arrangement of parts previously described, the hold-down members are tension-mounted. At the point where the backbone of the fish becomes of a size such that it exerts a pressure on the hold-down members sufficient to deleteriously affect the backbone, the cam follower 102, which has been stationary or oscillating on the cam 104, will be moved to a high point on the cam, with the result that the dog 64 will be released from the notch 80 and the rod 52 will be elevated upwardly, whereby the hold-down members will also be caused to move upwardly and disengage the fish, and the mechanism will operate as described in the next preceding paragraph. If desired, the set screw 86 may be retracted sufficiently so that the dog 64 is not in engagement with the notch 80, whereby the tension on the member 82 is released and the hold-down members 26 act through gravity alone.

Since it is obvious that various changes and modifications may be made in the above description without departing from the nature or spirit thereof, this invention is not restricted thereto except as set forth in the appended claims.

I claim:

1. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, tension means to maintain said hold-down members in position, means to adjust said tension means, and means to release said tension means when the pressure exerted by the backbone of the fish reaches a predetermined amount, whereby said hold-down members are elevated.

2. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, tension means to maintain said hold-down members in position, means to adjust said tension means, means to release said tension means when the pressure exerted by the backbone of the fish reaches a predetermined amount, whereby said hold-down members are elevated, and means to limit the downward movement of said hold-down members.

3. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, means to yieldingly mount each of said hold-down members, latching means to normally maintain said hold-down members in position, means releasing said latching means when the pressure exerted by said backbone reaches a predetermined amount, whereby said hold-down members are elevated, and means to adjust said latching means to permit release thereof when the pressure exerted by the backbone reaches said predetermined amount.

4. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, means to yieldingly mount each of said hold-down members, latching means to normally maintain said hold-down members in position, means releasing said latching means when the pressure exerted by said backbone reaches a predetermined amount whereby said hold-down members are elevated, means to adjust said latching means to permit release thereof when the pressure exerted by the backbone reaches said predetermined amount, and means to automatically restore the latching means to normal position.

5. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a shaft, means rotatably mounted on said shaft and connected to each of said rods, a pivotally mounted dog carried by each rod, a pair of notched members rotatably mounted on said shaft, each dog being adapted to cooperate with the notch of one of said notched members, spring means normally maintaining said dog in engagement with said notch, a pair of cams mounted on said shaft, a cam follower on each of said dogs to cooperate with one of said cams whereby when the upward pressure exerted on the rods reaches a predetermined value the cam follower will move outwardly causing disengagement between the dog and notch and permitting the rod to move upwardly, and spring means to restore each of said notched members to original position.

6. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a shaft, means rotatably mounted on said shaft and connected to each of said rods, adjustable stop means limiting the downward movement of each of said rods, a pivotally mounted dog carried by each rod, a pair of notched members rotatably mounted on said shaft, each dog being adapted to cooperate with the notch of one of said notched members, spring means normally maintaining said dog in engagement with said notch, a pair of cams mounted on said shaft, a cam follower on each of said dogs to cooperate with one of said cams whereby when the upward pressure exerted on the rods reaches a predetermined value the cam follower will move outwardly causing disengagement between the dog and notch and permitting the rod to move upwardly, and spring means to restore each of said notched members to original position.

7. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a shaft, means rotatably mounted on said shaft and connected to each of said rods, a pivotally mounted dog carried by each rod, a pair of notched members rotatably mounted on said shaft, each dog being adapted to cooperate with the notch of one of said notched members, spring means normally maintaining said dog in engagement with said notch, a pair of cams mounted on said shaft, a cam follower on each of said dogs to cooperate with one of said cams whereby when the upward pressure exerted on the rods reaches a predetermined value the cam follower will move outwardly causing disengagement between the dog and notch and permitting the rod to move upwardly, means to adjust each of said cams to effect the disengagement of the dog and notch when the rod reaches the predetermined position, and spring means to restore each of said notched members to original position.

8. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a yoke secured to the top of each of said rods, a pin mounted in each yoke, a shaft, a pair of arms, each arm being mounted on said shaft and connected to one of said pins whereby the respective rod is supported from said shaft, a dog pivotally mounted on each of said pins, a pair of notched members mounted on said shaft, each dog being adapted to cooperate with the notch of one of said notched members, a pair of cams mounted on said shaft, a cam follower on each of said dogs to cooperate with one of said cams whereby when the upward pressure on the rod reaches a predetermined value the cam will cause the cam follower to move outwardly causing the dog to disengage the notch and permitting the rod to move upwardly, tension means to restore each of said notched members to original position, and spring means to cause said dog to engage said notch.

9. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a yoke secured to the top of each of said rods, a pin mounted in each yoke, a shaft, a pair of arms, each arm being mounted on said shaft and connected to one of said pins whereby the respective rod is supported from said shaft, a dog pivotally mounted on each of said pins, a pair of notched members mounted on said shaft, each dog being adapted to cooperate with the notch of one of said notched members, a pair of cams mounted on said shaft, a cam follower on each of said dogs to cooperate with one of said cams whereby when the upward pressure on the rod reaches a predetermined value the cam will cause the cam follower to move outwardly causing the dog to disengage the notch and permitting the rod to move upwardly, means to adjustably position said cams to effect the disengagement of the dog and notch when the pressure exerted on the rod reaches said predetermined value, tension means to restore each of said notched members to original position, and spring means to cause said dog to engage said notch.

10. In a fish filleting machine having a pair of belly-slicing knives, a pair of traction discs below said belly-slicing knives and a pair of ribbing knives adjacent the discharge side of said slicing knives and traction discs, a deflector to direct a fish leaving the zone of action of the belly-slicing knives onto the ribbing knives comprising a pair of spaced hold-down members adapted to enter in the incisions made by said belly-slicing knives and ride on the backbone of said fish, a pair of levers, each of said levers being pivotally mounted at one end thereof and carrying one of said hold-down members at the other end, a pair of rods, each rod having its lower end connected to one of said levers, a yoke secured to the top of each of said rods, a pin mounted in each yoke, a shaft, a pair of arms, each arm being mounted on said shaft and connected to one of said pins whereby the respective rod is supported from said shaft, a dog pivotally mounted on each of said pins, a pair of notched members mounted on said shaft, each dog being adapted to cooperate with the notch of one of said notched members, a pair of cams mounted on said shaft, a cam follower on each of said dogs to cooperate with one of said cams whereby when the upward pressure on the rod reaches a predetermined value the cam will cause the cam follower to move outwardly causing the dog to disengage the notch and permitting the rod to move upwardly, means to limit the downward movement of each rod, tension means to restore each of said notched members to original position, and spring means to cause said dog to engage said notch.

CHARLES M. SAVRDA.

REFERENCES CITED

The following references are of record in the file of this patent:

UNITED STATES PATENTS

| Number | Name | Date |
| --- | --- | --- |
| 2,149,021 | Hunt | Feb. 28, 1939 |
| 2,149,022 | Hunt | Feb. 28, 1939 |